Oct. 9, 1956

W. E. SAXE 2,766,076

TROUGHING ROLL SUPPORTING APPARATUS

Filed May 3, 1954

INVENTOR.
WALTER E. SAXE
BY HIS ATTORNEYS.
HARRIS, KIECH, FOSTER & HARRIS

United States Patent Office 2,766,076
Patented Oct. 9, 1956

2,766,076

TROUGHING ROLL SUPPORTING APPARATUS

Walter E. Saxe, Pasadena, Calif., assignor to The Conveyor Company, Los Angeles, Calif., a corporation of California Application May 3, 1954, Serial No. 427,113

9 Claims. (Cl. 308—20)

The present invention relates in general to supporting means for rotatable members and a primary object of the invention is to provide improvements on the supporting means disclosed and claimed in my copending application Serial No. 68,905, filed January 3, 1949, now Patent No. 2,687,799, issued August 31, 1954. For convenience, the present invention will be considered in the same environment as said copending application.

Said copending application discloses supporting means for troughing rolls for supporting a conveyor belt, the troughing rolls shaping the belt into the form of a trough to better retain loose material thereon. Each roll is mounted on a shaft by means of thrust bearings, the ends of the shaft being supported by standards through which the shaft ends extend in certain embodiments. In order to maintain the thrust bearings for each roll in proper adjustment, the standards are leaf springs which are inwardly biased toward the respective bearings, force transmitting sleeves on the ends of the shaft being interposed between the leaf spring standards and the respective bearings to transmit the spring forces to the bearings.

While the foregoing construction operates very satisfactorily under almost all conditions, I have found that, when the rolls are operated at very high speeds, any roll unbalance tends to produce relative movement between the shaft ends and the leaf spring standards. Such tendency toward relative movement occasionally results in enlargement of the holes through the leaf spring standards in which the shaft ends are disposed, such hole enlargement proceeding more rapidly in installations where abrasive particles, such as silica dust particles, are present, such particles tending to work their way into any clearances between the shaft ends and the holes in the leaf spring standards to produce wear under conditions of roll vibration due to roll unbalance at high operating speeds.

In view of the foregoing, an important object of the present invention is to provide means for preventing such hole enlargement while retaining all of the advantages of the invention disclosed in said copending application.

More particularly, an object of the present invention is to provide the leaf spring standards with annular seats therein which diverge axially of the associated shaft in directions toward the adjacent bearings, and to provide the sleeves interposed between the standards and the adjacent bearings with complementary annular seats engaging the tapered seats on the standards. With this construction, the leaf spring standards themselves maintain the tapered seats therein in tight engagement with the tapered seats on the sleeves so as to prevent relative movement between the shaft ends and the standards even under conditions of high speed operation with severe roll unbalance, which is an important feature of the invention. Furthermore, through the use of such tapered seats, the bearing area between the shaft ends and the leaf spring standards is increased for the same spring standard thicknesses, which is another important feature since it further tends to eliminate hole enlargement. Also, hardened sleeves may be used, which still further tends to prevent hole enlargement.

The foregoing objects, advantages and features of the present invention, together with various other objects, advantages and features thereof which will become apparent, may be attained with the exemplary embodiment of the invention illustrated in the accompanying drawing and described in detail hereinafter.

Referring to the drawing.

Figure 1:
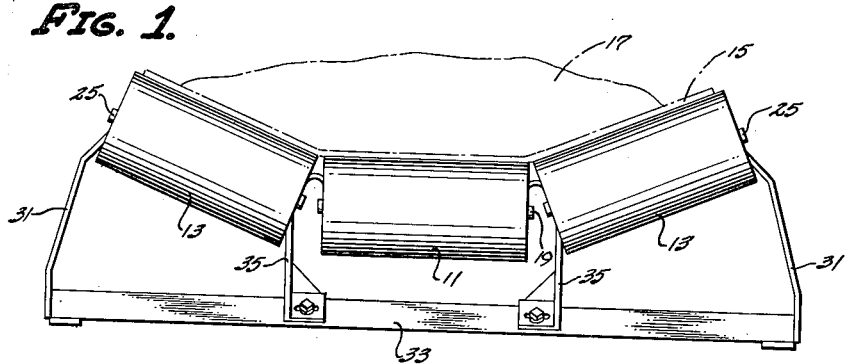
Fig. 1 is an elevational view of a troughing roll assembly incorporating the present invention therein.
Figure 2:
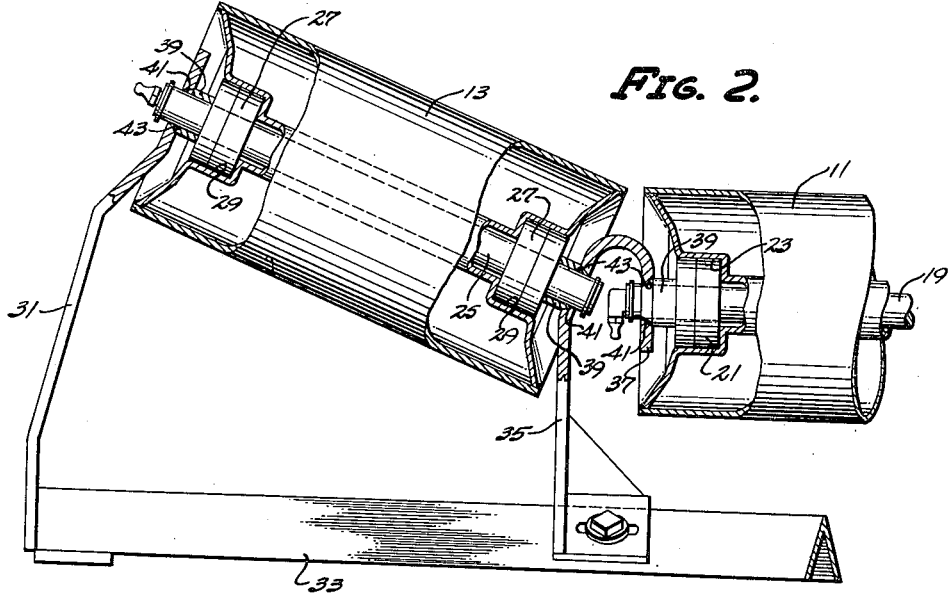
Fig. 2 is an enlarged fragmentary view, partially in section and partially in elevation, showing the troughing roll assembly of Fig. 1 in more detail and showing how the present invention is incorporated therein in more detail.

Referring to the drawing, illustrated therein is a troughing roll assembly which includes a horizontal roll 11 flanked by inclined rolls 13, a conveyor belt 15 carrying a load 17 being supported and troughed by the rolls 11 and 13.

The horizontal roll 11 is mounted on a shaft 19, thrust bearings 21, only one of which is visible in the drawing, being interposed between the roll 11 and the shaft 19 and being seated in recesses 23 in the roll 11. Similarly, each roll 13 is mounted on a shaft 25, thrust bearings 27 seated in recesses 29 in each roll 13 being interposed between such roll and the corresponding shaft 25.

The outer ends of the shafts 25 are supported by outer leaf spring standards 31 mounted on a base 33, the inner ends of the shafts 25 being supported by inner leaf spring standards 35 mounted on the base 33. The inner standards 35 are doubled back on themselves to provide arms 37 for supporting the ends of the shaft 19. On the outer end of each shaft 25 is a sleeve 39 which is seated against the corresponding standard 31 and the corresponding bearing 27, the bias of such standard being toward the adjacent bearing so that the sleeve 39 maintains the bearing properly adjusted as more fully described in said copending application. Identical sleeves 39 are interposed between the leaf spring standards and adjacent bearings throughout the entire roll assembly, the bias in each instance being toward the adjacent bearing so that each sleeve maintains the associated bearing in proper adjustment automatically.

Figure 3:
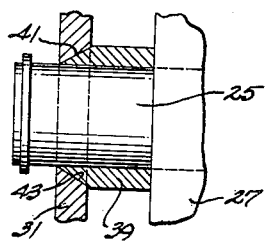
Fig. 3 is a further enlarged, fragmentary sectional view illustrating the present invention in detail.
Figure 4:
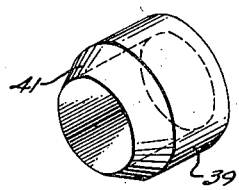
Fig. 4 is an isometric view of a sleeve forming part of the present invention.

Referring particularly to Fig. 3 of the drawing, each sleeve 39 is seated at one end against the corresponding bearing and is provided at its end farthest from the corresponding bearing with a tapered annular shoulder or seat 41 which is complementary to and in engagement with an annular seat 43 in the corresponding standard, the seats 43 being axially aligned with the corresponding shafts and diverging toward the adjacent bearings. In the particular construction illustrated, the seats 43 in the standards encircle holes in the standards through which the corresponding shaft ends extend.

As will be apparent, the bias of the leaf spring standards toward the adjacent bearings is transmitted to the bearings by the sleeves 39 and maintains the tapered seats 43 in the standards in tight engagement with the complementary seats 41 on the sleeves 39. Consequently, relative movement between the shaft ends and the leaf spring standards is substantially completely eliminated even at high operating speeds with severely unbalanced rolls, thereby substantially completely eliminating enlargement of the holes through the standards even under such conditions, which is an important feature of the invention.

Preferably, one of the sleeves 39 on each shaft is fixed thereon as by sweating, for example, which prevents the shaft from turning, the other sleeve on each shaft being free thereon to permit the desired spring action of the standards on the bearings and on the sleeves themselves.

Although I have disclosed an exemplary embodiment of my invention herein for purposes of illustration, it will be understood that various changes, modifications and substitutions may be incorporated in such embodiment without departing from the spirit of the invention as defined by the claims which follow.

I claim as my invention:

1. In an apparatus of the character described, the combination of: a shaft; a rotatable member on said shaft; bearing means interposed between said member and said shaft and rotatably mounting said member on said shaft; spring means for supporting one end of said shaft, said spring means being biased axially of said shaft toward said bearing means; and a force transmitting element interposed between said spring means and said bearing means, said element having an axially tapered seat engaging a complementarily tapered seat on one of said means.

2. In an apparatus of the character described, the combination of: a shaft; a rotatable member on said shaft; bearing means interposed between said member and said shaft and rotatably mounting said member on said shaft; spring means for supporting one end of said shaft; said spring means being biased axially of said shaft toward said bearing means; and a sleeve element on said shaft and interposed between said spring means and said bearing means, said element having an axially tapered seat engaging a complementarily tapered seat on one of said means.

3. In an apparatus of the character described, the combination of: a shaft; a rotatable member on said shaft; bearing means interposed between said member and said shaft and rotatably mounting said member on said shaft; spring means for supporting one end of said shaft, said spring means being biased axially of said shaft toward said bearing means; and a sleeve element on said shaft and interposed between said spring means and said bearing means, said element having an axially tapered seat engaging a complementarily tapered seat on said spring means.

4. In an apparatus of the character described, the combination of: a shaft; a rotatable member on said shaft; bearing means interposed between said member and said shaft and rotatably mounting said member on said shaft; leaf spring means biased axially of said shaft toward said bearing means and having therein an annular seat axially aligned with said shaft and diverging axially of said shaft toward said bearing means; and a sleeve on said shaft between said spring means and said bearing means and having thereon an annular seat complementary to and seated on the first annular seat mentioned.

5. An apparatus as defined in claim 4 wherein said sleeve is free on said shaft.

6. An apparatus as defined in claim 4 wherein said sleeve is fixed on said shaft.

7. In an apparatus of the character described, the combination of: a shaft; a rotatable member on said shaft; a pair of bearing means interposed between said member and said shaft and rotatably mounting said member on said shaft; a pair of leaf spring means respectively disposed at the ends of said shaft and biased axially of said shaft toward said bearing means respectively, said spring means respectively having therein annular seats axially aligned with said shaft, said annular seats respectively diverging toward said bearing means; and a pair of sleeves on said shaft, one between one of said spring means and the bearing means adjacent thereto, and the other between the other of said spring means and the bearing means adjacent thereto, said sleeves having thereon annular seats complementary to and engaging said annular seats on said spring means, respectively.

8. An apparatus as defined in claim 7 wherein one of said sleeves is fixed on said shaft and the other is free thereon.

9. In an apparatus of the character described, the combination of: a rotatable member; bearing means rotatably mounting said rotatable member; spring support means biased axially of said rotatable member toward said bearing means; and force transmitting means interposed between said spring support means and said bearing means, said force transmitting means having an axially tapered seat engaging a complementarily tapered seat on one of said spring support means and bearing means.

References Cited in the file of this patent

UNITED STATES PATENTS

| | | |
|---|---|---|
| 2,429,117 | Benjamin | Oct. 14, 1947 |
| 2,613,117 | Lee | Oct. 7, 1952 |